United States Patent [19]

Getreuer et al.

[11] Patent Number: 4,779,253
[45] Date of Patent: Oct. 18, 1988

[54] SAMPLED SERVO FOR AN OPTICAL DISK DRIVE

[75] Inventors: Kurt W. Getreuer, Colorado Springs, Colo.; Johannes J. Verboom, Bergeyk, Netherlands; David L. Schell; David E. Lewis, both of Colorado Springs, Colo.

[73] Assignee: Laser Magnetic Storage International Company, Colorado Springs, Colo.

[21] Appl. No.: 902,278

[22] Filed: Aug. 29, 1986

Related U.S. Application Data

[63] Continuation-in-part of Ser. No. 760,450, Jul. 30, 1985, abandoned.

[51] Int. Cl.⁴ .............................................. G11B 7/00
[52] U.S. Cl. ...................................... 369/44; 369/109
[58] Field of Search ............... 369/43, 44, 46, 109, 369/111, 32, 59, 275; 358/342; 360/77, 78

[56] References Cited

U.S. PATENT DOCUMENTS

| | | | |
|---|---|---|---|
| 3,138,669 | 6/1964 | Rabinow et al. | 179/100.4 |
| 3,854,015 | 12/1974 | Janssen | 179/100 |
| 3,876,842 | 4/1975 | Bouwhuis | 179/100 |
| 3,881,184 | 4/1975 | Koepcke et al. | 360/78 |
| 4,037,252 | 7/1977 | Janssen | 369/111 X |
| 4,142,209 | 2/1979 | Hedlund et al. | 358/128 |
| 4,151,566 | 4/1979 | Ohrman | 360/72.1 |
| 4,195,320 | 3/1980 | Andresen | 360/78 |
| 4,239,942 | 12/1980 | Van Alem et al. | 179/100.1 |
| 4,257,074 | 3/1981 | Goss | 360/78 |
| 4,488,275 | 12/1984 | Ceshkovsky et al. | 369/44 |
| 4,677,602 | 6/1987 | Okano et al. | 369/44 X |
| 4,685,096 | 8/1987 | Romeas | 369/44 |

OTHER PUBLICATIONS

Photonics Spectra, Jun. 1985, p. 60.

*Primary Examiner*—Robert L. Richardson
*Attorney, Agent, or Firm*—Sheridan, Ross & McIntosh

[57] ABSTRACT

Sampled servo data comprising one pit centered on a track and two pits spaced ¼ track pitch from track center on opposite sides thereof provide for two sinusoidal tracking signals, one radially phase offset from the other by 90 degrees. A first tracking signal derived from subtracting the signals of the offset pits has a zero crossing at track center and is used by the servo system for tracking. Its derivative is used for damping. A second tracking signal derived from all three pits has maxima at track centers and is therefore 90 degrees out of phase with the first tracking signal. This second signal provides track crossing information, and when used in quadrature with the first tracking signal, provides information about the radial direction of crossing. The second signal also provides a control signal for inverting the damping signal while between tracks when the derivative of the first tracking signal would ordinarily be negative and provide for negative damping.

22 Claims, 6 Drawing Sheets

IPLED SERVO FOR AN OPTICAL DISK DRIVE

This application is a continuation-in-part of copending Ser. No. 760,450 filed July 30, 1985, and now abandoned, Kurt W. Getreuer et al. inventors, and currently assigned to Laser Magnetic Storage International Company. That part of Ser. No. 760,450 disclosed and claimed herein is the joint invention of the applicants.

BACKGROUND OF THE INVENTION

1. Field of the Invention

The invention relates to optical disk drives and more particularly to their tracking servos.

2. Brief Description of the Prior Art

U.S. Pat. No. 4,037,252 issued to U.S. Philips Corporation is incorporated by reference. This patent describes a servo system comprising three laser beams striking an optical disk and from which two radially varying sinusoidal signals are recovered, one offset from the other by 90 degrees. A first signal comprises a difference signal from two offset beams and has a zero crossing at track center. This signal is provided as an error signal to the disk drive's servo system so that it might servo on the zero crossing. The first signal's scaled derivative is subtracted from the first signal to the provide for positive damping. Between tracks, the damping derivative is negative. This ordinarily would cause servo system instability. However, here, the second signal, offset from the first by 90 degrees, is wholly negative and when shaped into a square wave provides a control signal for inverting the damping derivative signal so that damping again is positive.

U.S. Pat. No. 4,456,981 issued to Magnetic Peripherals Inc. is incorporated by reference. This patent discloses offset locations for providing tracking and track crossing information in an optical disk drive. When one crosses the drive's tracks radially, the radially adjacent offset locations combine to produce a signal having flattened peaks in the radial dimension.

U.S. Pat. No. 4,428,069 issued to Burroughs Corporation describes an enlarged timing pit followed by elongated, narrow, staggered offset servo pits spaced close to the center of a track.

SUMMARY OF THE INVENTION

The present invention produces the two radial-dimension sinusoidal signals used for tracking, track counting (crossing) during seek and for inverting damping by providing a combination of three servo data pits in an optical recorder, a centered pit located on track center, and two offset pits located off track center. Linear spacing between the three pits provides the means for discriminating between the pits.

The two offset pits provide for the first tracking signal. The signals from these two pits are subtracted and provide a sinusoidal signal in the radial dimension with zero crossings at track centers. This first signal is input to the drive's servo system. It provides fine tracking servo information and when used in quadrature with the second signal derived from the centered and offset pits provides the radial direction of track crossing.

A combination of the three pits provides the second tracking signal, radially phase offset from the first tracking signal by 90 degrees. This signal is used for track crossing information (it has zero crossings at quarter track pitch), for inverting damping, and for determining the direction of track crossings (in quadrature combination with the first signal) during track seek operations.

The second signal is derived by subtracting the signal caused by one offset pit from the centered pit, subtracting the signal from the other offset pit from the centered pit, and then adding the two subtracted signals. This resultant signal provides for a DC free signal. A DC free signal is important in that a signal having a DC component does not provide reliable zero-crossing information, and the zero-crossings of the second tracking signal are used herein to provide track crossing information.

When the optical disk drive optics and laser beam are centered on a track between the two offset pits, positive damping is provided by the derivative of the first tracking sinusoidal signal. However, when the optics and laser beam are centered outside the two pits, the derivative is negative and makes for negative damping, an undesirable situation. However, the second tracking signal provides a control signal for inverting the damping signal, again restoring positive damping.

DESCRIPTION OF THE PREFERRED EMBODIMENT

Figure 1:
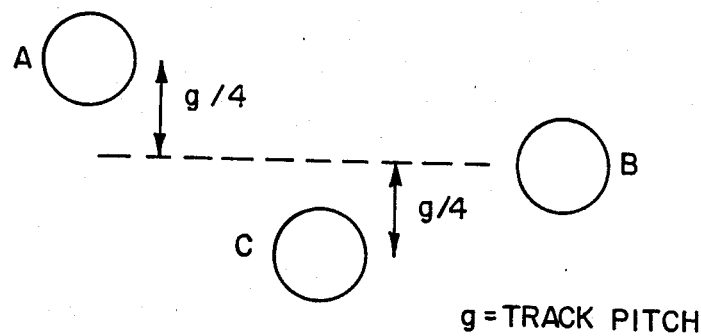
FIG. 1, a-c, show the preferred arrangement of the servo data pits.

FIG. 1 shows a preferred set of three data pits in a servo data area. Areas containing the pits are interspersed among areas containing data along a track. Track data areas in the preferred embodiment preferably do not include a preformatted groove, although such a groove having a depth of one-eighth wavelength of the laser read beam may be employed. Tracks over the whole disk can either be concentric or spiral, but when viewed only over the small portion of a given track or tracks as discussed herein, the tracks are substantially concentric. Areas containing servo data pits are radially aligned, track or track. This enables sampling of the pits during a seek (i.e., the phase lock loop triggering sampling of the servo data pits triggers at the appropriate time as tracks are crossed, and may be refreshed by locking on to one of the pits, preferably the centered pit). The pits discussed herein are similarly preformatted pits and have the same size and shape; herein they are substantially circular and are one quarter wavelength deep. For other media types, the invention herein contemplates the use of other forms of media alteration that would achieve substantially the same result as the pits discussed herein. While the areas coning the servo pits could have a shallow (less than a-twelfth wavelength) preformatted groove, they preferably have no groove at all because the groove interferes with the proper detection of the pits.

Figure 2:
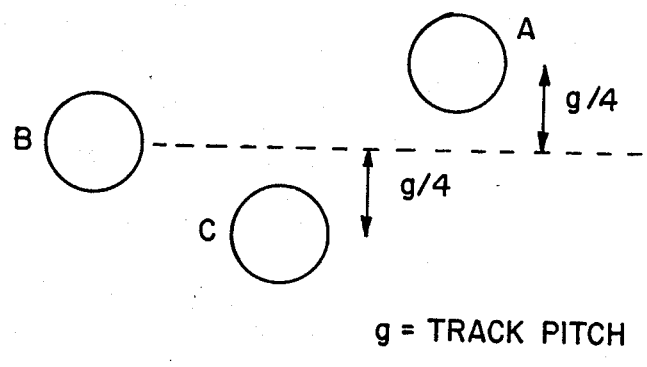
FIG. 2, a-c, show an alternative arrangement of the servo pits.

A trailing pit B is aligned on the center of a track s. Spaced up the track a short distance from pit B and offset from track center by one quarter of the track pitch of the optical disk are pits C and A, the track pitch being the radial distance between adjacent track centers. The pits are preferably spaced apart longitudinally as well. The pits should have at least 1.5 times the size of a pit between pits. Other arrangements for the pits are contemplated herein. FIG. 2 shows one alternative example. Here, pit B leads pits A and C.

Figure 3:
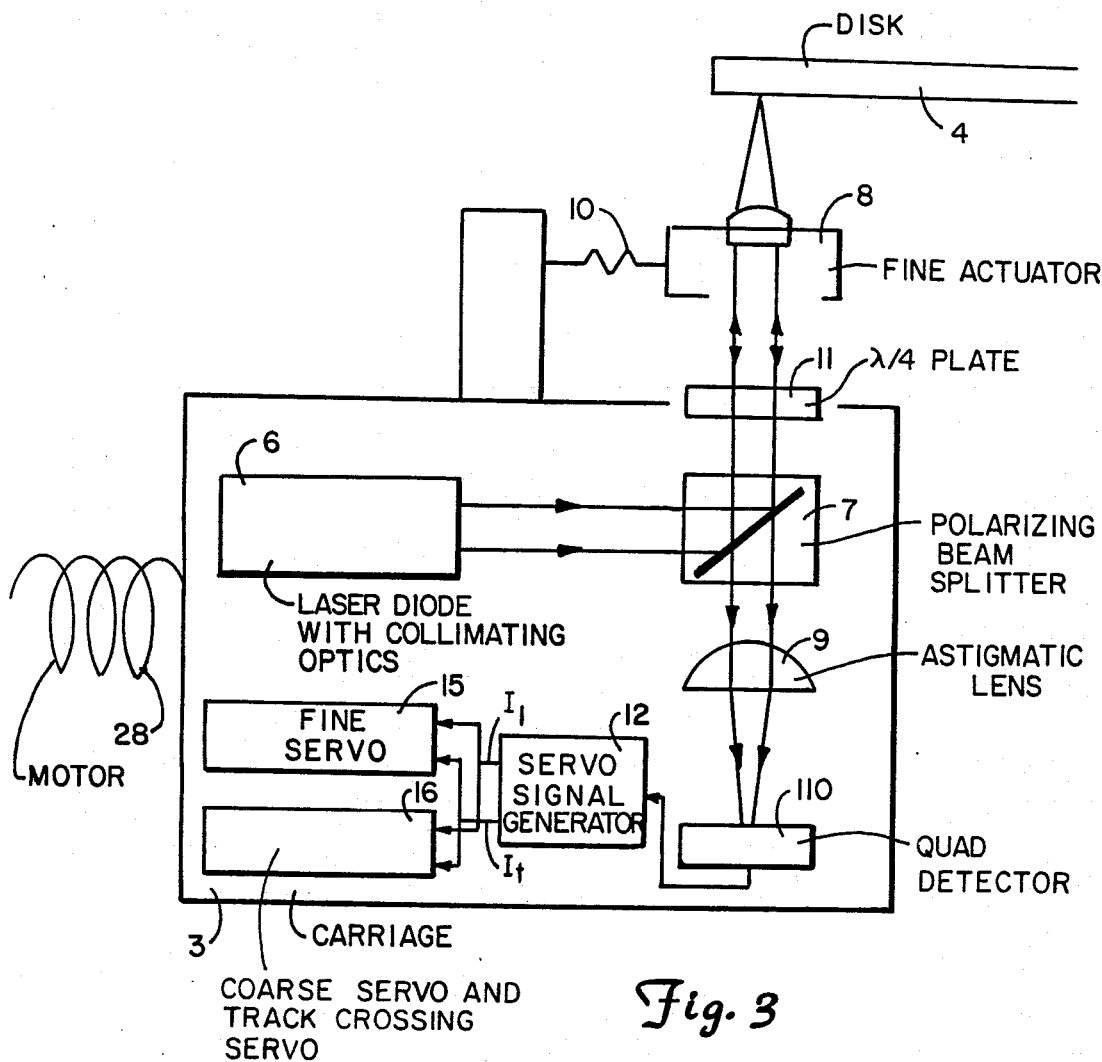
FIG. 3 shows an optical disk drive, disk, laser, optics, and servo systems useful with the present invention.

FIG. 3 shows the preferred optical disk drive. Polarizing beam splitter 7 reflects a laser beam emitted by laser 6, mounted in movable carriage 3, through a quarterwave plate 11 and a fine actuator 8 to a disk 4 having the tracks and servo data pits formed thereon. The beam is reflected from disk 4 back through the beam splitter 7 and an astigmatic lens 9 to a quad detector 110. The quad detector 110 provides output signals which are summed in a servo signal generator 12. The quad detector 110 and the servo signal generator 12 output the two tracking signals $I_1$ and $I_t$ to both a fine servo 15 and a coarse servo 15 and track crossing servo 16. The fine servo controls a motor 10 for controlling the fine actuator 8. The coarse servo and track crossing servo 16 controls a servo motor 18 which controls movement of carriage 3. The coarse servo and track crossing servo 16 is primarily used for track to track movement, especially during seek operations. (The elements, 12, 15 and 16 need not be mounted on the carriage 3.)

Figure 4:
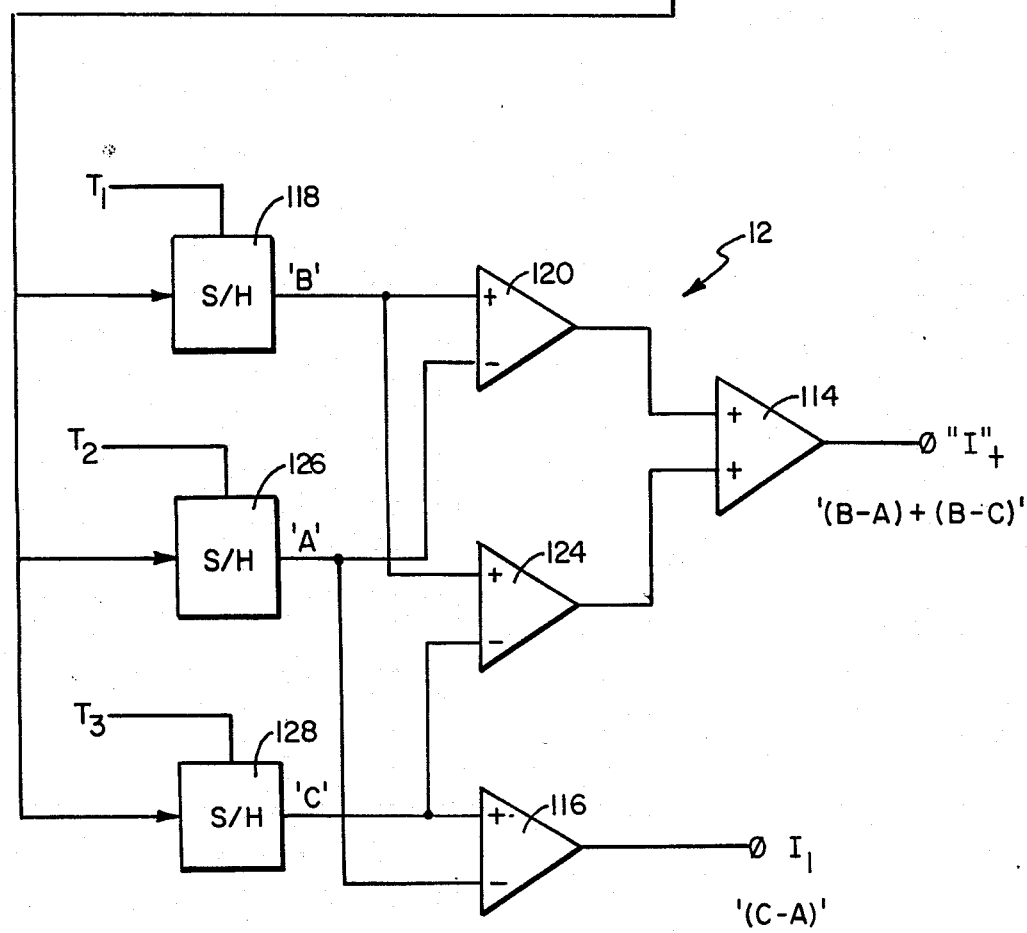
FIG. 4 shows a quad detector and circuit for deriving two tracking signals from the servo data pits.

FIG. 4 shows the preferred tracking servo signal generator 12 for detecting the preferred pit arrangement and providing two radially varying sinusoidal signals for tracking and controlling the damping of the optical disk drives servo systems. While the quad detector 110 is shown herein, all elements are summed. This is equivalent to providing a single detector diode, as those skilled in the art will appreciate.

A laser beam focused onto the disk with a spot small enough to detect the offset pits when centered on a track is directed to the optical disk and reflected carrying with it the light amplitude modulation caused by a pit. The amplitude of the signal produced by a pit is maximum when the beam is centered on a pit and minimum when the beam is one-half track offset from a pit (but radially aligned therewith and with an adjacent pit on the next track). The optics of the optical drive images the reflected beam onto to the detector 110. As the optics and laser beam pass pit B a Gaussian shaped signal appears out of summer 112. Similarly for pits A and C. The signals caused by pits A and C out of the summer 112 when the beam spot is centered on a track are equal (including DC components) and when subtracted should result in a value of zero. This corresponds to the zero crossing of the sinusoidal signal.

Further, the signal caused by pit B on all four elements of the quad detector is maximized when the beam spot is centered on a track. Thus a signal out of summer 112 caused by pit B would be 90 degrees out of phase with a difference signal from detecting pits C and A (in the radial direction).

Thus in FIG. 4, the signals from the four quadrants of the quad detector 110 are input to summing junction 112. The output of the summing junction is provided to three sample and holds 118, 126, and 128 which are enabled by timing signals T1-T3 respectively. Timing signals T1-T3 occur when a single servo data pit is imaged on the detector 110. T1 occurs when pit B is present. T2 occurs when pit A is present. T3 occurs when pit C is present.

The preferred optical disk has a plurality of servo data pit areas along each track, interspersed with ordinary data. The servo data is preferably recorded with a defined relationship with conventional clocking data prerecorded on the disk such that the timing signals T1-T3 can be provided by the same timing means used to sample ordinary data. In addition, the centered serco data pit can itself be used for timing. As disclosed in copending Ser. No. 760,450, the data is recorded in a fixed block code and the servo data pits are recorded in a longitudinal relationship which violates the code and may be recognized therefor as servo data. For example, if pits A and C, at least the trailing one, are spaced farther from trailing centered pit B than the fixed block code permits, the system will recognize that it is reading a servo data area. Thereafter, pit B is used as a timing pit to synchronize a phase lock loop, which is refreshed at subsequent pit B's, and also controls the timing of sampling of the servo data pits (timing signals T1-T3) and data (no prerecorded clock is needed in a preformatted groove).

The outputs of sample and holds 126 and 128 are subtracted at differential amplifier 116 to yield signal $I_1$, the first tracking signal which is used for fine servo and its scaled derivative for damping. This signal is also used by the coarse servo and track crossing servo 16 to determine track crossings.

The output of sample and hold 118 (pit B) is provided to the positive inputs of differential amplifiers 120 and 124, the negative inputs of which are provided with the outputs of sample and holds 126(A) and 128(C) respectively. The outputs of these two differential amplifiers are input to summing amplifier 114, the output of which comprises signal $I_t$, the second tracking signal used to invert damping, determine track crossings, and in quadrature with the first tracking signal, track crossing direction. By performing the two subtractions before adding the results, DC components in the signals (B, A and C) drop out. The resultant signal $I_t$, is proportional to B, has a maximum at a track center and is 90 degrees out of phase (radially) with the signal from the subtraction of A and C, $I_1$.

Figure 5:
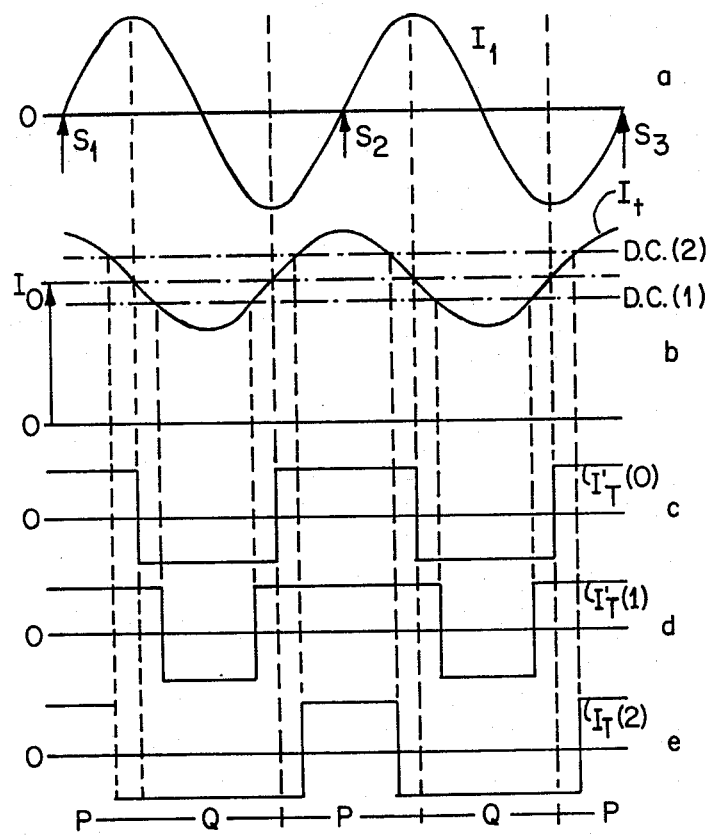
FIG. 5 a-e show the two tracking signals derived from the servo data pits and a square wave signal generated from the second tracking signal useful in controlling the inversion of the damping signal.
Figure 6:
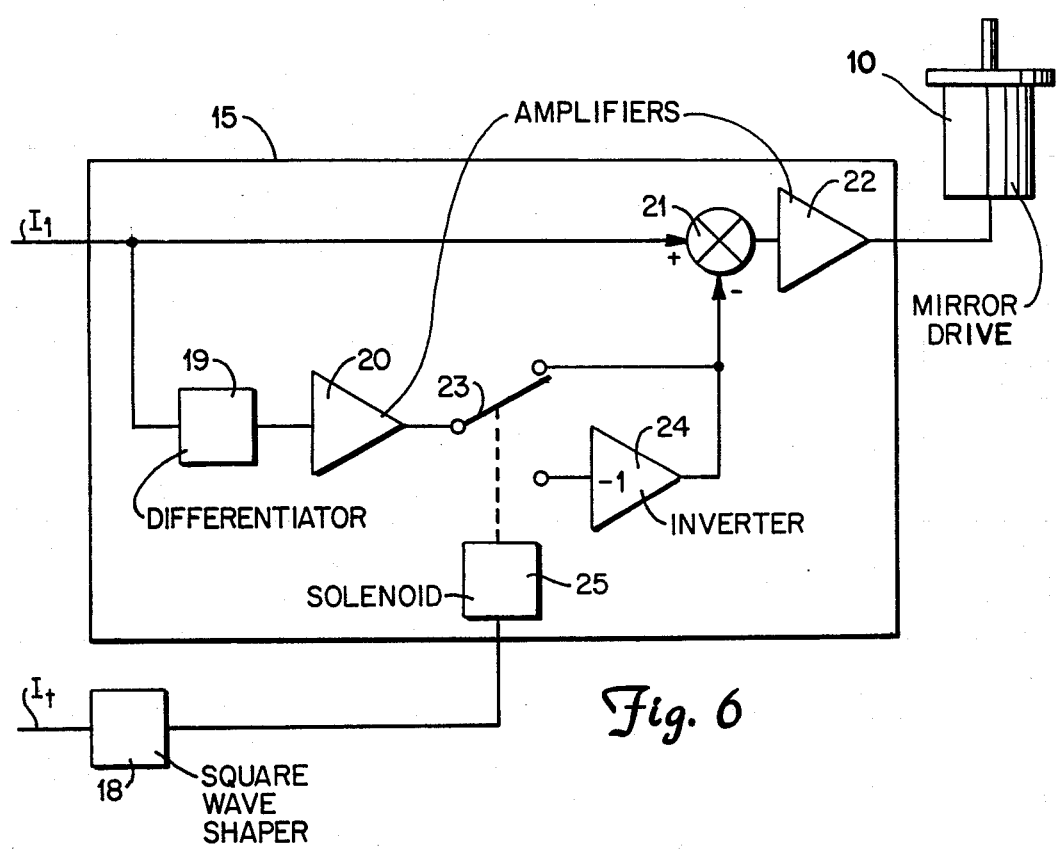
FIG. 6 shows a detail of a fine servo system with inverted damping between tracks useful with the present invention.

FIG. 5, which is a copy '252's FIG. 6, shows the radial relationship between signals $I_1$ and $I_t$ and tracks s1 to s3. It can be seen that $I_1$ and $I_t$ are both sinusoidal and offset by 90 degrees, the former having a zero crossing at track centers and the latter being negative between tracks, i.e. outside the boundaries comprising pits A and C. One signal can be denominated a sine signal and the other a cosine, to denote this phase relationship.

The latter signal, $I_t$, is shaped by a square wave shaper in combination with a level detector (not shown herein, but described in '252) to form the square waves shown in FIG. 5 c-e. The negative portions of these square waves are used as a control signal to invert the damping in the fine servo 15. One such circuit is shown in FIG. 6, which is a copy of FIG. 8 of '252. The damping derivative signal is inverted under control of solenoid 25 in combination with switch 23 and inverter 24 in response to the square wave from shaper 18, which is responsive to second tracking signal $I_t$. The function of the circuit of FIG. 6 is described fully in '252.

In the preferred optical disk, all pits of the same type are radially aligned. See FIG. 7, which shows yet a third variant of the pit arrangement. Thus all pit B's are in alignment. Similarly for pits A and C. This arrangement makes the timing of track crossings simpler and provides for continuous sampling of the servo data during seeks.

Figure 7:
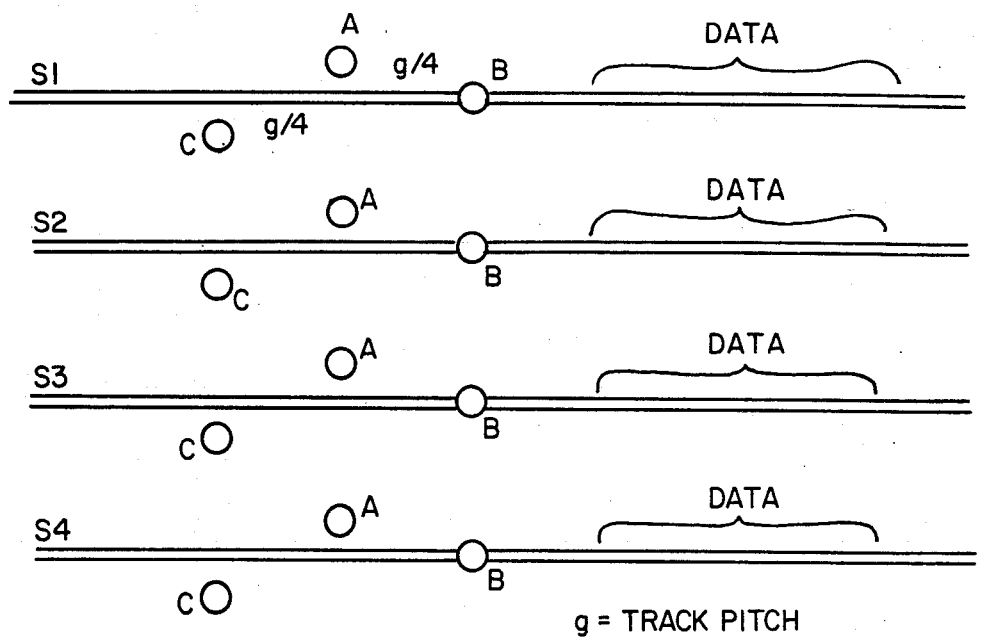
FIG. 7 shows the radial alignment of the servo data pits over a number of tracks.

As shown in FIG. 7, data areas, which may include a preformatted groove, follow the servo data area.

Figure 8:
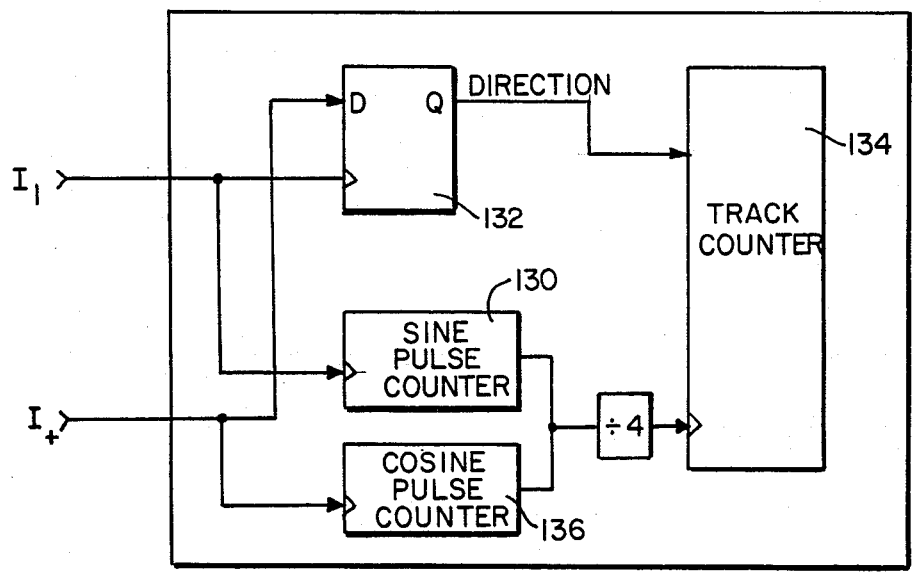
FIG. 8 shows a block diagram of the coarse servo's track crossing counter.

The use of sine and cosine signals in quadrature for providing track crossing direction information is well known in the art. An exemplary coarse servo seek circuit is shown in FIG. 8. This circuit counts the zero crossings of both signals, $I_t$ and $I_1$, of which there are four per track, in zero crossing/track crossing pulse detectors 130 and 136, the outputs of which are divided by four and input to a track counter 134. The track counter 134 increments or decrements under control of the direction signal output by a quadrature detector 132, which determines the direction of movement from the sine and cosine signals, $I_1$ and $I_t$. Specifically, the sine signal $I_1$ is input to the clock input of a D flip flop 132, which triggers the D input to the Q output on a positive going transition, and the cosine signal is input to the D input. The state of the cosine signal (either 1 or $-1$) when the flip flop is clocked therefore depends upon which direction the track crossing is occurring.

I claim:

1. In an optical disk drive having a disk with concentric or spiral tracks and a laser beam, optics and detector means for tracking said tracks, servo data pits comprising:
   at least one centered servo data pit centered on a track and at least two offset servo data pits offset on opposite sides of track center by one quarter of the track pitch; each of said servo data pits being of substantially the same size and shape, and wherein two servo signals are generated using two or more of said servo data pits.

2. Apparatus for generating servo signals in an optical disk drive having a disk with concentric or spiral tracks and a laser beam, comprising:
   a first servo data pit centered on a track;
   a second servo data pit outwardly, radially offset from said first servo data pit;
   a third servo data pit inwardly, radially offset from said first servo data pit; and
   servo signal generator means responsive to said servo data pits and the laser beam for deriving a first servo signal using said offset pits and a second servo signal using said centered and offset pits, the second servo signal radially offset from the first by substantially 90 degrees.

3. Apparatus according to claim 2 wherein said servo signal generator means includes:
   means for subtracting a signal detected from said second servo data pit from a signal detected from said third servo data pit to generate said first servo signal.

4. Apparatus according to claim 2 wherein said servo signal generator means includes:
   means for subtracting a signal detected from said second servo data pit from a signal detected from said first servo data pit;
   means for subtracting a signal detected from said third servo data pit from said signal detected from said first servo data pit; and
   means for adding said two subtracted signals to form said second tracking signal.

5. Apparatus according to claim 2 wherein:
   said first, second and third servo data pits of a first track are radially aligned with the corresponding said first, second and third servo data pits of a second track.

6. Apparatus according to claim 2 wherein:
   said first, second and third servo data pits are recorded in an area of a track having no preformatted groove.

7. Apparatus according to claim 5 wherein:
   said first, second and third servo data pits are recorded in an area of a track having no preformatted groove.

8. Apparatus according to 2 wherein:
   said first, second and third servo data pits are recorded in a servo data area, and a plurality of said area are recorded on each track interspersed with data.

9. Apparatus according to claim 5 wherein:
   said first, second and third servo data pits are recorded in a servo area, and a plurality of said area are recorded on each track interspersed with data.

10. Apparatus according to claim 6 wherein:
    said first, second and third servo data pits are recorded in a servo data area, and a plurality of said area are recorded on each track interspersed with data.

11. Apparatus according to claim 7 wherein:
    said first, second and third servo data pits are recorded in a servo data area, and a plurality of said area are recorded on each track interspersed with data.

12. Apparatus according to claim 2 wherein:
    said first servo data pit follows said second and third servo data pits.

13. Apparatus according to claim 2 wherein:
    said first, second and third servo data pits are each preformatted holes one-quarter wavelength of the laser beam deep.

14. Apparatus according to claim 2 wherein:
    said first, second and third servo data pits are spaced longitudinally from each other at least 1.5 times the size of each pit.

15. Apparatus according to claim 2 wherein:
    data is recorded on said tracks in a fixed block format and said first, second and third servo data pits are recorded with at least one of said pits not having the fixed block format relationship to the other said pits.

16. Apparatus according to claim 2 wherein:
    data is recorded on said tracks in a fixed block format and said first, second and third servo data pits are recorded with said first servo data pit spaced from at least the adjacent one of said second or third servo data pit farther than the distance specified by the fixed block format relationship.

17. Apparatus according to claim 4 further comprising:
    servo system means responsive to said first servo signal, said servo system means including damping means responsive to said first servo signal and means for controlling said damping means in response to said second servo signal.

18. Apparatus according to claim 17 wherein:
    said means for controlling said damping means in response to said second servo signal includes means for inverting the output of said damping means when the laser beam of the optical disk is centered outside the offset servo data pits between tracks.

19. Apparatus according to claim 4 further comprising:
servo system means including a quadrature direction detector means responsive to both said first and said second servo signals for determining the direction of track crossing movement.

20. Apparatus according to claim 19 further comprising:
means responsive to said quadrature direction detector means and to said servo signal for counting tracks during seek operations.

21. Apparatus according to claim 2 wherein:
data is recorded in a predetermined format and said first, second and third servo data pits are recorded in a pattern distinguishable from said predetermined format.

22. An apparatus for generating at least one servo signal in an optical disk drive having a disk with concentric or spiral tracks and a laser beam, comprising:
a first servo data pit centered on a track;
a second servo data pit outwardly, radially offset from said first servo data pit;
a third servo data pit inwardly, radially offset from said first servo data pit; and
means for generating a servo signal from said first servo data pit, said second data pit and said third servo data pit, said servo signal having a maximum when the laser beam is centered relative to said first servo data pit.

* * * * *